US008874960B1

(12) United States Patent
Khan et al.

(10) Patent No.: US 8,874,960 B1
(45) Date of Patent: Oct. 28, 2014

(54) PREFERRED MASTER ELECTION

(75) Inventors: Tameen Khan, Los Angeles, CA (US);
Jun Lu, Irvine, CA (US); Robert Spier,
Northridge, CA (US); Laura Werner,
Sunnyvale, CA (US); Sandor Szego,
Redwood City, CA (US); **Shibani
Sanan**, Saratoga, CA (US)

(73) Assignee: GOOGLE Inc., Mountain View, CA (US)

( * ) Notice: Subject to any disclaimer, the term of this patent is extended or adjusted under 35 U.S.C. 154(b) by 384 days.

(21) Appl. No.: 13/315,007

(22) Filed: Dec. 8, 2011

(51) Int. Cl.
*G06F 11/00* (2006.01)

(52) U.S. Cl.
USPC .............................. 714/11; 714/4.1; 714/4.11

(58) Field of Classification Search
CPC ..... G06F 11/0709; G06F 11/16; G06F 11/20;
G06F 11/202; G06F 11/2023; G06F 11/2025;
G06F 11/2028; G06F 11/203; G06F 11/2033

USPC .................................. 714/4.1, 4.11, 11, 13, 42
See application file for complete search history.

(56) References Cited

U.S. PATENT DOCUMENTS

| | | | |
|---|---|---|---|
| 2002/0002613 A1* | 1/2002 | Freeman et al. | 709/225 |
| 2003/0037283 A1* | 2/2003 | Srinivasan et al. | 714/11 |
| 2007/0016663 A1* | 1/2007 | Weis | 714/4 |
| 2009/0070623 A1* | 3/2009 | Sciacca | 714/4 |
| 2011/0188506 A1* | 8/2011 | Arribas et al. | 370/400 |

* cited by examiner

*Primary Examiner* — Joseph D Manoskey
(74) *Attorney, Agent, or Firm* — Birch, Stewart, Kolasch & Birch, LLP

(57) ABSTRACT

Systems and method of automated master election for high availability database system are discussed herein. Automated lock competition and master worker selection based on factors that may include geographic parameters, processing power, connection speed, and relative locations of database(s) and worker(s) are also discussed.

11 Claims, 3 Drawing Sheets

PREFERRED MASTER ELECTION

BACKGROUND

To protect against single cluster failures due to scheduled or unscheduled maintenance, change requests, or disasters bringing down a cluster, and facilitate automatic failover, high-availability schemes have multiple worker jobs running in multiple clusters. A manually administered lock scheme or a manually initiated lock competition is used to elect a master from among the worker jobs. Such an approach does not provide for the ability to give preference to some workers in becoming master over other workers. It is currently not possible to automatically prefer workers which are situated closest to some arbitrary hub, such as a database (for instance, in order to minimize communication latency). It is also not currently possible, in such a master election scheme, to cause automatic failover to workers in the next-closest cluster if all the workers in the preferred cluster die or are unhealthy for any reason. Also in the context of master election based on communication latency minimization, it is not currently possible to avoid workers in an unhealthy cluster from becoming preferred even if they are closest to the hub. Also in the context of master election, it is not currently possible to "tether" the failover of a master worker to the failover of a hub based purely on preference and/or automated election parameters.

Current solutions to the above problems require a human watching the hub location, calculating which worker would be closest to the hub and accordingly bringing the worker jobs up/down in the cluster manually calculated to be preferred and healthy (and not affected by upcoming maintenance or change requests). But since this requires constant human involvement, this solution would be error prone and inefficient. An automated solution to the above problems is therefore desirable and preferable.

SUMMARY

One variation of the present disclosure relates to a computing arrangement having automated preferred master election capability. Such a system may comprise: a first cell at a first location having at least one first cell worker, the first cell being designated a preferred cell and the first cell worker being designated a master worker, where a master worker is one that is permitted to interact with data on a production database; a first preference server, said first preference server being designated as a master preference server; a second cell at a second location having at least one second cell worker; and a second preference server.

Some variations may allow for multiple master workers within a cell. In some variations, multiple master workers may utilize or otherwise require multiple database connections. In other variations, multiple master workers may share one or more database connections to one or more common databases.

In some variations, such a system may be configured so that, responsive to receiving a notification of a production database failover event, the first and second preference servers each calculate new preference parameters based on the database failover event, a geographic location of a new production database, the first cell location, and the second cell location, the second cell location being closer to the geographic location of the new production database than the first cell location; the first and second preference servers identify the second cell as a newly preferred cell based on the calculated new preference parameters; the master preference server writes the calculated new preference parameters and the identified newly preferred cell to a preference file available to workers in the first and second cells, the written new preference parameters indicating that the second cell is now designated as the preferred cell; workers in the first and second cells read the preference file having the written new preference parameters; the first cell worker loses its designation as the master worker responsive to reading the preference file, said losing including releasing at least one master lock previously held by the first cell worker; the second cell worker acquires the released master lock; and the second cell worker is designated as the new master worker for the new production database.

Other variations of the present disclosure relate to a method of preferred master election in a database system, the method comprising: providing a first cell having a first cell location and at least one first cell worker, the first cell being designated as a current preferred cell and one first cell worker being designated as a master worker, where a master worker is one that is permitted to interact with data on a production database; providing a second cell having a second cell location and at least one second cell worker; detecting a database failover event indicating a transition from a first production database to a second production database; notifying a master preference server of the database failover event; re-computing preference information for the first and second cells based on said notifying, a location of the second production database, the first cell location, and the second cell location, the second cell location being closer to the location of the new production database than the first cell location; identifying the second cell as a newly preferred cell based on the re-computed preference information; updating a preference file with the re-computed preference information and information about the newly preferred cell, said updating being performed by the master preference server; reading the updated preference file with said at least one first cell worker and removing the current preferred status of the first cell in response to said reading; reading the updated preference file with at least one second cell worker and designating the second cell as the newly preferred cell in response to said reading; removing the master worker status of the one first cell worker in response to said reading, where removing the master worker status causes the one first cell worker to release at least one master lock; initiating a lock competition where one second cell worker acquires the released master lock; and designating the one second cell worker as the master worker for the second production database by the master preference server responsive to the one second cell worker acquiring the released master lock.

In some variations of such a method, the at least one second cell worker includes a plurality of second cell workers; said plurality of second cell workers compete with each-other to acquire said master lock in said lock competition; and the one second cell worker from among said plurality that acquires said master lock is designated as the master worker for the second production database by the master preference server.

In further variations of such a method, the at least one master lock includes a plurality of master locks; said plurality of second cell workers compete with each-other to acquire multiple master locks in said lock competition; the one second cell worker from among said plurality of second cell workers that acquires the majority of available master locks is designated as the master worker for the second production database by the master preference server.

In variations allowing for multiple master workers within a cell, there may be as many master locks as permitted master workers, with each potential master worker having to acquire a master lock. In other variations, lock competition may proceed such that master workers are identified based on a number of master locks acquired by each worker, with the top two or three or more workers being designated as master workers. In yet further variations, completely separate master election schemes may be managed for worker sets within a cell that perform non-overlapping or otherwise disparate functions either on the same or on different databases.

Other variations of the present disclosure may pertain to method of preferred master election in a database system, the method comprising: providing a first cell having a first cell location and at least one first cell worker, the first cell being designated as a current preferred cell and one first cell worker being designated as a master worker, where a master worker is one that is permitted to interact with data on a production database; providing a second cell having a second cell location; detecting at least one second cell worker being added to the second cell; notifying a master preference server of the detected at least one second cell worker; re-computing preference information for the first and second cells based on said notifying, a location of the production database, the first cell location, and the second cell location, the second cell location being closer to the location of the production database than the first cell location; identifying the second cell as a newly preferred cell based on the re-computed preference information; updating a preference file with the re-computed preference information and information about the newly preferred cell, said updating being performed by the master preference server; reading the updated preference file with said at least one first cell worker and removing the current preferred status of the first cell in response to said reading; reading the updated preference file with at least one second cell worker and designating the second cell as the newly preferred cell in response to said reading; removing the master worker status of the one first cell worker in response to said reading, where removing the master worker status causes the one first cell worker to release at least one master lock; initiating a lock competition where one second cell worker acquires the released master lock; and designating the one second cell worker as the master worker for the production database by the master preference server responsive to the one second cell worker acquiring the released master lock.

Other variations of the present disclosure may pertain to a method of preferred master election in a database system, the method comprising: providing a first cell having a first cell location and at least one first cell worker, the first cell being designated as a current preferred cell and one first cell worker being designated as a master worker, where a master worker is one that is permitted to interact with data on a production database; providing a second cell having a second cell location and at least one second cell worker; detecting a database failover event indicating a transition from a first production database to a second production database; notifying a master preference server of the database failover event; re-computing preference information for the first and second cells based on said notifying, parameters associated with the first cell; and parameters associated with the second cell; identifying the second cell as a newly preferred cell based on the re-computed preference information; updating a preference file with the re-computed preference information and information about the newly preferred cell, said updating being performed by the master preference server; reading the updated preference file with said at least one first cell worker and removing the current preferred status of the first cell in response to said reading; reading the updated preference file with at least one second cell worker and designating the second cell as the newly preferred cell in response to said reading; removing the master worker status of the one first cell worker in response to said reading, where removing the master worker status causes the one first cell worker to release at least one master lock; initiating a lock competition where one second cell worker acquires the released master lock; and designating the one second cell worker as the master worker for the production database by the master preference server responsive to the one second cell worker acquiring the released master lock.

In some variations of such a method, parameters associated with the first cell include information about a data connection speed at the first cell; parameters associated with the second cell include information about a data connection speed at the second cell; and the data connection speed at the second cell is faster than the data connection speed at the first cell.

In other variations of such a method, parameters associated with the first cell include information about a data connection speed at the first cell and a location of the first cell; parameters associated with the second cell include information about a data connection speed at the second cell and a location of the second cell; and said re-computing includes determining a first distance between the first cell location and a location of the second production database; combining the first distance and the data connection speed at the first cell to compute a first total data transit time between the second production database and the first cell; determining a second distance between the second cell location and the location of the second production database; and combining the second distance and the data connection speed at the second cell to compute a second total data transit time between the second production database and the second cell; where said second total data transit time is less than said first total data transit time.

Yet other variations of the present disclosure may pertain to a non-transitory computer-readable medium having instructions stored therein which, when executed by one or more processors, cause the processors to perform at least part of one of the above-discussed methods or variations thereof. Further variations still may pertain to systems including one or more processors and such a computer-readable medium.

The variations described above are discussed in relation to a database, but may be equally applicable to other information, application, or service hubs such as mail servers, domain name servers, preference servers, and other hub-type computing resources.

Further scope of applicability of the systems and methods discussed will become apparent from the detailed description given hereinafter. However, it should be understood that the detailed description and specific examples, while indicating preferred embodiments of the systems and methods, are given by way of illustration only, since various changes and modifications within the spirit and scope of the concepts disclosed herein will become apparent to those skilled in the art from this detailed description.

BRIEF DESCRIPTION OF THE DRAWINGS

The systems and methods discussed will become more fully understood from the detailed description given herein below and the accompanying drawings which are given by way of illustration only, and thus are not limitative, and wherein.

DETAILED DESCRIPTION

Figure 1:
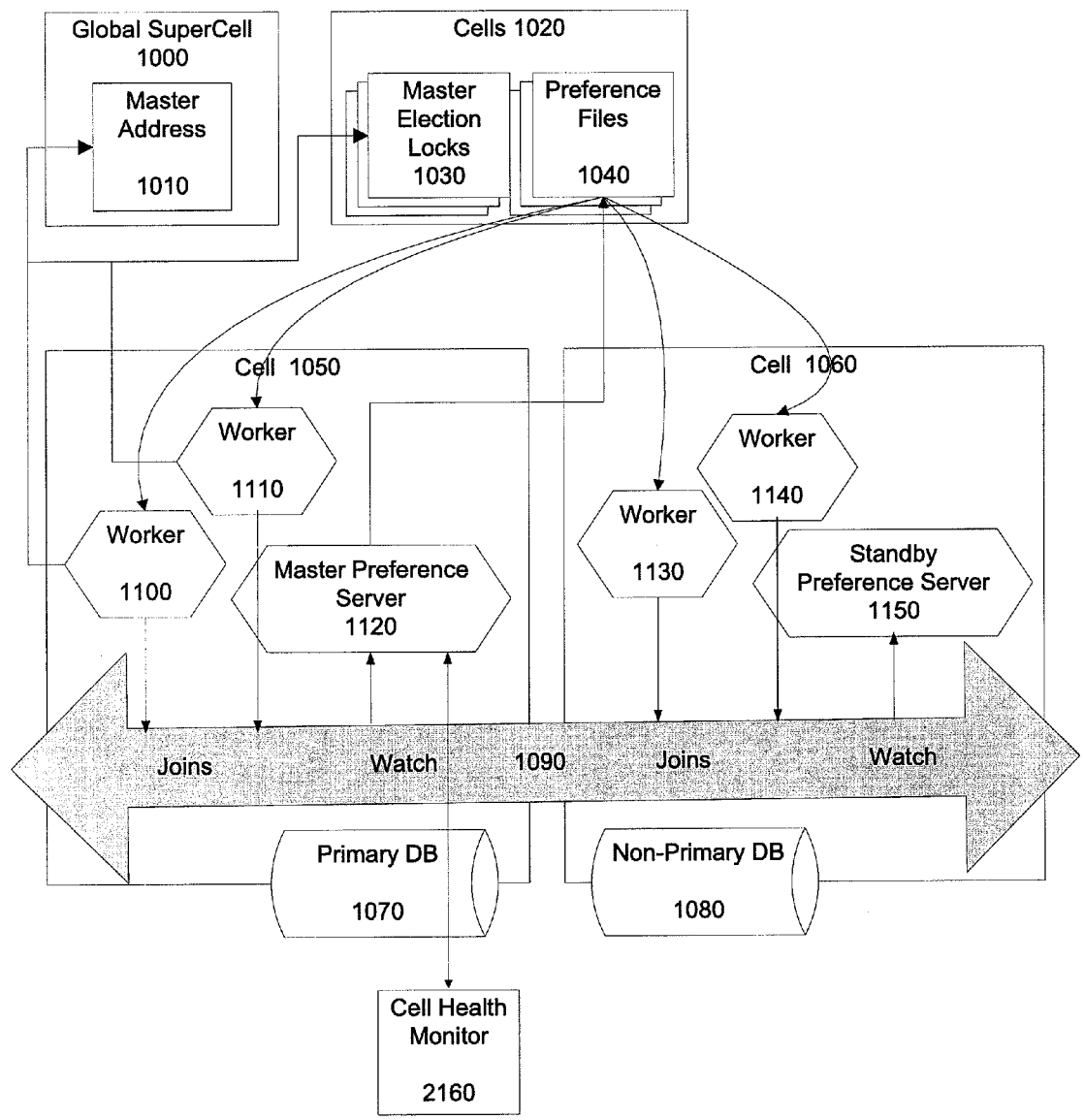
FIG. 1 depicts an embodiment of a system design as described herein.

The following detailed description refers to the accompanying drawings. The same reference numbers in different drawings identify the same or similar elements. Also, the following detailed description does not limit the concepts discussed. Instead, the scope of the concepts discussed herein is defined by the appended claims and equivalents thereof.

To protect against single cluster failures (due to maintenance, change requests, or disasters bringing down a cluster) and facilitate automatic failover, it is preferable to have multiple worker jobs running in more than one cluster. Ideally, the workers in each cluster should be active in order to facilitate rapid and seamless failover. However, only some subset of workers, known as master workers, are permitted to do work that affects a hub, such as a production database. The master workers are workers located in or associated with a cluster that has the highest preference in the system. In some variations, a cluster may have only one master worker. In other variations, multiple master workers may be employed and managed within a cluster.

In some variations, highest preference may be given to the healthiest/most functional cluster that is geographically closest to the hub. In the case of a database, this may be done to avoid long latency of writes to the primary database, which would otherwise lead to sub-optimal performance. In some situations, long write latency can cause large numbers of database connections to be opened up in situations where there are only a limited number of connections to go around. A similar issue may exist with various connection-limited applications and data sources, and also with applications and data sources/data interfaces having a limited amount of connections/connection resources. Although embodiments will be described below in reference do database-type solutions, it will be apparent that the techniques and solutions herein are equally applicable to other information, application, or service hubs such as mail servers, domain name servers, preference servers, and other hub-type computing resources.

For example, two clusters may be geographically equidistant from a primary database but one may have a T1 connection and the other may have a T3. In such a case, the T3 cluster may be more preferred than the T1 cluster due to faster connection speed. In some cases, the T3 cluster may even be slightly farther away from the primary database than the T1 cluster but nonetheless be more preferred because of improved data throughput and reduced latency as a result of the faster connection.

Resource-limited clusters may pose similar issues. A first equidistant cluster may have more available processors and/or more memory than a second cluster. The first may be more preferred in such a case because the improved processing power may lead to improved data rates and improved performance. Similarly, the first cluster may even be further away but may compensate sufficiently for distance-related latency with increased processing capability to make it nonetheless more preferred.

Embodiments of the systems and methods discussed herein will be disclosed within the context of a cluster management utility configured with a global "supercluster" that encompasses all the clusters, however, any cluster management utility that is configured for asynchronous, fault-tolerant communication between nodes may employ the techniques, tools, devices, and system configurations discussed herein.

The cluster where the workers to do real work will be referred to as the preferred cluster, and the scheme by which the workers decide the preferred cluster and master worker will be referred to as preferred master election. "Real work" in this context means data processing operations that are allowed to interact with and affect the contents of the primary database. Such operations may include writing data, committing or rolling back transactions, and other operations that add, remove, or change the data in the database. Only one worker in a cluster is permitted to perform "real work" that affects the primary database. Other workers in the cluster may be active and performing mirror/shadow operations for redundancy and/or for easy transition between workers in the event of master worker failure or failover. Depending on the worker type, only one worker may need to be active in the preferred cluster or all workers may need to be active. The solutions discussed herein address both scenarios.

In clustered computing environment dealing with database applications, primary database cluster is typically not static, and it may be configured to fail over to a different cluster at any point. Such failover may be triggered by one or more system management/system recovery tools. Failover, in this context, merely implies changing the location of the primary database cluster by designating the current primary database cluster as a stand-by or back-up or offline cluster and designating a different database cluster as the new primary. Such a change in designation may occur as a result of software or hardware failure, system maintenance, change requests, or some other deliberate and/or scheduled change-over unrelated to health and integrity or a system or systems.

When one of the above triggering events happens, the preferred cluster containing or hosting the master worker job may also be automatically failed over to a cluster which is now more preferred based on the new location of the primary database. Also, if all the workers in the preferred cluster become non-operational or otherwise break for any reason, there is preferably automatic failover to the workers in the next-most preferred cluster. In some variations, as noted previously, database preference for clusters and workers may be based on relative geographical locations. In other variations, preference may be based on factors other than and/or in addition to geographical location of the cluster and workers. Factors may include processing power, total memory, data connection speed, and other factors such as total uptime since last failure and/or failover. Uptime issues may be important especially in situations where regular cluster maintenance occurs as an uptime above a certain amount may indicate an impending cluster failover due to maintenance.

In order to accomplish such intelligent failover, a cluster management and master election scheme should preferably meet the following criteria: (1) Distributed Scheme—the preferred workers should preferably be decided in a distributed fashion, and a single job should not be responsible for making such a decision; (2) Consistency Guarantees—at any time, only one cluster should be preferred and, if required, only one worker should think it is the master; (3) Failure Recovery—if a worker dies, the next preferred one should become the master (if required). If all workers in a preferred cluster die, then preferably the next-closest cluster to the primary database should automatically become the preferred cluster; (4) Automatic Preference Re-election—failover should occur automatically, without manual intervention, when the primary database moves.

The automatic preference re-election aspect acts as a tether that ensures certain workers will always meet a particular set of criteria before being permitted to compete for the role of master worker. In some variations, this is accomplished by only allowing workers in a preferred cluster or cell to compete for the role of master worker. Clusters or cells may be given a preferred status based on certain parameters of that cluster and their degree of match to parameters in a preference file or database.

An embodiment of a system design meeting the above criteria is shown in FIG. 1. In the embodiment shown, a preferred cluster (also known as a primary cell) 1050 may be associated with a primary database cluster 1070 (and, in some variations, may even host or contain the primary database 1070). Such a preferred cluster 1050 will have one or more worker jobs 1100, 1110 running at/on the cluster, with one of the workers 1100 being designated as the master worker. As noted above, the master worker job is the worker that is permitted to do "real work," i.e. access/write data to the primary database 1070. The master worker 1100 is designated by the outcome of a lock competition, which is where workers able to become the master worker compete to secure one or more master election locks 1030 distributed among the eligible cells 1020. The master worker 1100 is also identified to the overall system 1000 via the master address file/database 1010. The overall system is aware of available workers 1100, 1110 and of workers that may be coming online or going offline through a discovery service 1090 that identifies workers and reports their activity to other participants or members of the discovery service 1090

An eligible cell is one that, based on the health of the resources in the cell (worker jobs online/offline, hardware working/not working) and the parameters of the cell (geo-location, connection speed, computing hardware, etc.), is eligible to become a primary cell.

The primary cell may also be associated with a master preference server 1120. The master preference server 1120 reads and writes preference data to/from one or more preference files and/or file databases 1040 shared by the eligible cells 1020. The preference files store information about the desired properties of a primary/preferred cell. The master preference server 1120 may also communicate with a cell health monitor 2150 that logs and records overall cluster health for one or more cells whose preference is set or otherwise determined by the preference server 1120. The preference file(s) 1040 may be embodied as one or more forms of shared storage that may be represented as files or directories within a file system, or may be simply be locations in a database or memory storage area accessible to the preference server 1120 and workers 1100, 1110, 1130, 1140.

Variations of the preference file(s) may also store information about the status and location of workers and the overall health/status of a cell based on the workers in that cell. Such information is provided to the preference files 1040 via the master preference server 1120 from a discovery service 1090. In some variations, a preference file may include a list for every worker group ID showing a currently preferred cell ID associated with that worker group. This may be implemented in a database, a flat file, a spreadsheet, or any other suitable list management format. The group ID identifies a group of workers subject to a master election process and the cell ID identifies the cell which is preferred based on the requirements and constraints of a particular master election scheme.

Workers 1100, 1110, 1130, 1140 join the discovery service when active or operational and transmit a "heartbeat" signal that indicates the worker is operational and ready for use. Variations of such a heartbeat signal may also include information about the worker's location, its connection speed, overall network congestion levels, the type of hardware the worker is running on, time since last failure/shutdown, and any other information that may be deemed relevant or useful to collect and measure about a worker.

Variations of a discovery service may include any number of commercially available or privately/custom developed and/or customized network polling and/or data collection services. Variations of a preference server 1120 may include physical and/or virtual servers, server groups, and combinations thereof. Variations of workers 1100, 1110 may include dedicated and/or specialized hardware devices running particular processes, commercial and/or custom-build hardware and/or software utilities, virtual and/or distributed applications running on one or more processors/devices, and/or combinations thereof.

Variations of a cell/cluster 1050 may include a group of devices at a particular physical location, such as a server farm, a particular pool of resources located on a particular device or device group, or some combination thereof. Variations of a database 1070 may include one or more servers, server systems, storage devices, storage device arrays, applications, application systems, and combinations thereof.

The database 1070 may be part of and/or otherwise physically or operably connected to the cell 1050, or it may be logically associated with the cell 1050 and physically implemented in one or more different systems and/or locations than the cell 1050. In a variation where the database 1070 is loosely coupled to the cell 1050 in such a fashion, the database 1070 may be re-located or failed over independently of the cell 1050.

Variations of database re-location and/or failover may be caused by hardware failure, system maintenance, change request, power outage, or at the decision of one or more system administrators/managers. A failover event (so called because when the primary designation is removed from the current database cluster, that designation "fails over" to a new database cluster) will cause the primary database 1070 to either be taken offline or otherwise be re-designated as a non-primary database 1080, with a new database (potentially in a new location) being designated as the primary database 1070.

When a new database is designated as the primary database, all the worker jobs in all the clusters 1100, 1110, 1130, 1140 are placed in an "offline" state by the preference server 1120. The offline state does not necessarily imply that the worker jobs stop running or otherwise become inoperable. It only indicates that there is no longer a master worker job designated in the system. Since only a worker job designated as the master worker can interact with the database and do "real work," the "offline" state of all the worker jobs means that none of them are permitted to do "real work."

This change is triggered by the some form of notification service informing the preference server 1120 of the database failover event. At that time the master preference server 1120 updates the preference files 1040 with the new primary database 1070 information.

In some variations, the discovery service 1190 may include the database failover notification service. In other variations, a separate notification or watch service or mechanism may be employed to notify the preference servers 1120 1150 of a database failover event while the discovery service 1190 notifies the preference servers 1120 1150 of cells and workers coming online and offline.

Although a standby preference server 1150 is available in another cell 1060, the standby preference server is used to provide high availability of the preference server functionality. The high availability paradigm of the preference servers 1120, 1150 may be independent from the high availability and failover paradigms of the cells or workers. An active, operational preference server must be present in at least one of the cells in order to facilitate preferred master election, but the preference server itself is not necessarily subject to the same election scheme as the workers in the event of preference server failure or failover. The preference server master and standby servers 1120 1150 are depicted to indicate that the preference server is a highly available system that does not have a single point of failure.

The preference file update also triggers the master worker to release the election locks 1030 and suspends worker activity since it is no longer listed as preferred in the preference files 1040. Meanwhile, workers 1110, 1100 in a newly preferred cell read the preference files 1040 and are informed that they are now preferred. These workers 1110 1100 now compete for the role of master worker by acquiring the master election lock(s) 1030.

The preference file updates and subsequent master election processes are automated and may be based on one or more parameters and/or settings such as geographic location relative to the new primary database 1070, speed of data connection(s) between the cell and the database 1070, number of network hops between the cell and the database 1070, and other factors related to reliability, latency, and processing speed. Such determinations may be made using any number of known network and system evaluation techniques.

In some variations, geographic data alone may be sufficient for preference computation. In some such variations, a new primary database 1070 may have a known or readily discernible geographic location provided via the notification service 1090. Such a location may be indicated as a reference to a list of known database locations, a location associated with a particular router on a network having a known layout, or a location parameter provided to or otherwise stored in the database and transmitted via the notification service 1090.

In some variations, a geo-location matrix showing the relative locations of all cluster cells and all databases may be available or accessible in the system. Such a geo-location matrix may enable a rapid determination of proximity between cells and a database depending on which database is the production database at any time. In such a variation, a database location independent of the geo-location matrix may be replaced with a database ID that informs a preference server using the geo-location matrix for preference computation as to which database location in the matrix is the correct or current location.

In other variations, a table of known database and cell geographic locations may be accessible by or available to the preference servers 1120 1150. In such variations, the geographic location of the database may be compared against the geographic locations of the cells in order to calculate the nearest active cell.

In some variations, a preference calculation may include one or more back-up preference locations. Such variations may be used when there is no way to know, prior to preference calculation, if a particular cell is healthy or otherwise capable of becoming the preferred cell. In such variations, a preference server may calculate a first preferred cell. In a geographic location based preference paradigm, such a cell would be the one closest to the primary database 1070. A preference server may then calculate a second, third, or even fourth (or more) preferred cell. These back-up preferred cells may be the second, third, fourth (and onward) closest cells to the primary database.

In other variations, a preference server may, upon making a calculation indicating a particular cell as preferred, poll that cell to gauge its health and current status. If the potential preferred cell is unhealthy or un-available, the preference server may proceed to calculate the next-most-preferred cell based on the geographic information and preference paradigm. In some variations, the preference server may also transmit the status of an unhealthy cell via the notification service 1090 to indicate that the cell requires repair, maintenance, or other attention to restore it to a healthy operating state.

Once a new preferred cell 1050 is identified for the new primary database 1070, the preference server 1120 1150 registers with the discovery service 1090 to be notified about workers coming up and down. The preference server 1120 1150 also talks to the new primary database and, based on the database parameters, the preference server updates the preference files, which inform the workers 1100, 1110 about which of them may now compete for the available locks 1030 to elect a master worker 1100 within the cell 1050.

The preference server publishes preference information in the preference files 1040 and the workers read the preference files to decide if they participate in the master election scheme. Two broad types of master election scheme may be implemented: single-lock and multiple-lock. A single-lock scheme has one master lock available on a per-cell basis. The eligible worker that first secures that lock becomes the master worker 1100 for the cell.

A multiple-lock scheme has multiple locks to allow for partial in-cell failures while still enabling master election. This is because if a single lock within a cell is not released by a previous worker and/or that master worker is partially operational such that it retains the lock but does not function properly, a single-lock scheme will prevent the election of a new master worker. A multiple-lock scheme allows for a worker to become a master by grabbing a majority of locks, therefore unavailable individual locks are less likely to contribute to system problems.

Although only two cells are depicted in FIG. 1, it should be readily apparent to one skilled in the art that the concepts and solutions discussed herein are applicable to systems having an arbitrary number of cells and an arbitrary number of workers per cell.

Figure 2A:
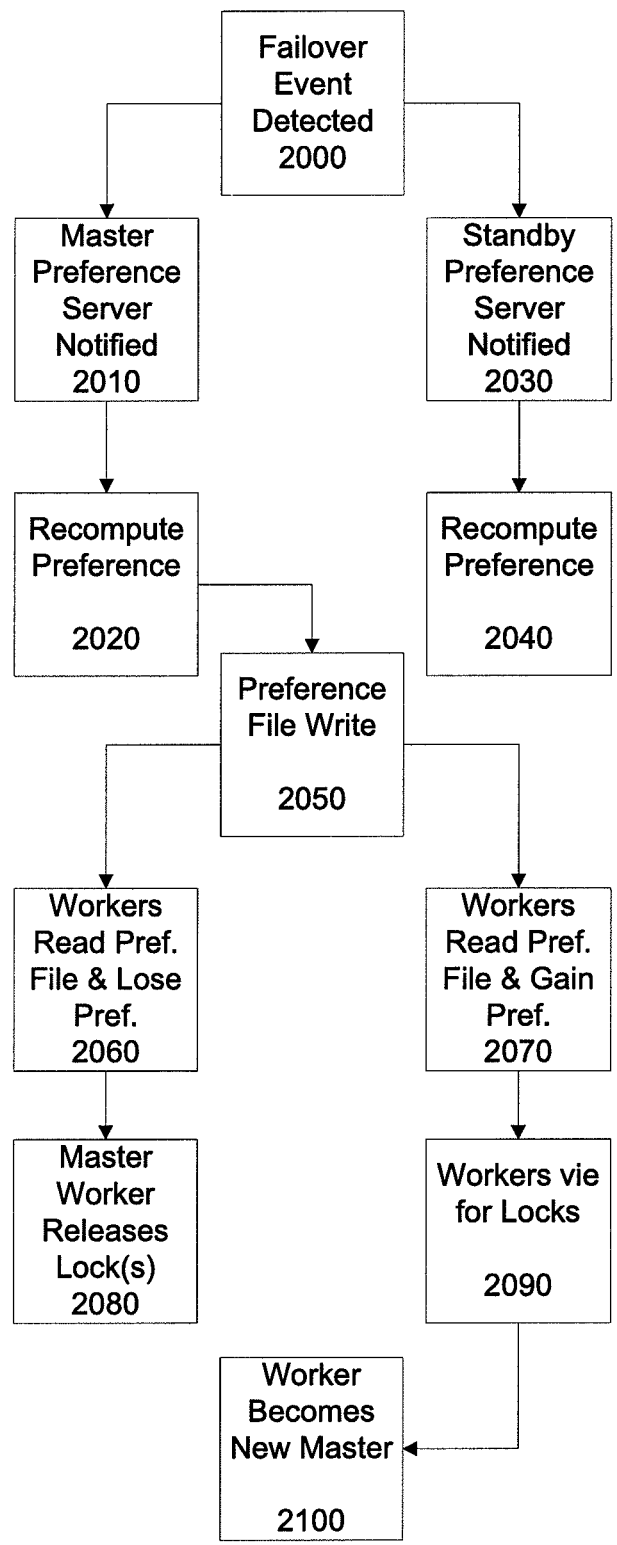
FIG. 2a depicts flowchart showing a variation of an automated master election scheme as described herein.

A flowchart showing a variation of an overall event sequence from database failover to new master election is depicted in FIG. 2a. In the variation shown, a database failover event 2000 is detected within a global cell or cell group. A database failover event may include hardware failure, system maintenance, PCR, power outage, or any other triggering event that would cause a primary database location to be moved. The failover event may be detected by a discovery service or similar notification service operating within and/or across a network. In some variations, multiple notification/discovery services may be operating and passing information between each-other.

Such a discovery/notification service may then notify the preference servers 2010 2030 of the failover event. All preference servers in the cell or cell group are notified 2010 2030 of the failover event by a notification service. Each preference server then re-computes the preference parameters for a preferred cell or a preferred worker 2020 2040. The master preference server then writes the re-computed preference parameters to one or more preference files 2050.

Although a master and a standby preference server are depicted, multiple preference servers may be present within the global cell or cell network. The preference servers may operate on a master election scheme independent of the master election scheme used for the workers. In some variations, each cell may be equipped with a preference server to ensure that a preference server is always available to update the preference files so long as at least one cell is operational.

The workers in the cell preferred prior to database failover read the preference file and are informed that they are no longer preferred 2060. Workers in a cell that is now indicated as preferred after the database failover also read the preference file and are informed that they are now preferred 2070. The master worker in the newly non-preferred cell releases its master lock(s) 2080. Having lost master status, this worker no longer has the ability to perform "real" work on the database. As the old master worker releases its master lock(s) 2080, the workers in the newly preferred cell vie for the one or more available master locks 2090 to elect a new master worker. The worker in the newly preferred cell that has successfully acquire the master lock (or, in variations using multiple locks, successfully acquired the most locks) then becomes the new master worker 2100 and is allowed to perform "real" work on the database.

Figure 2B:
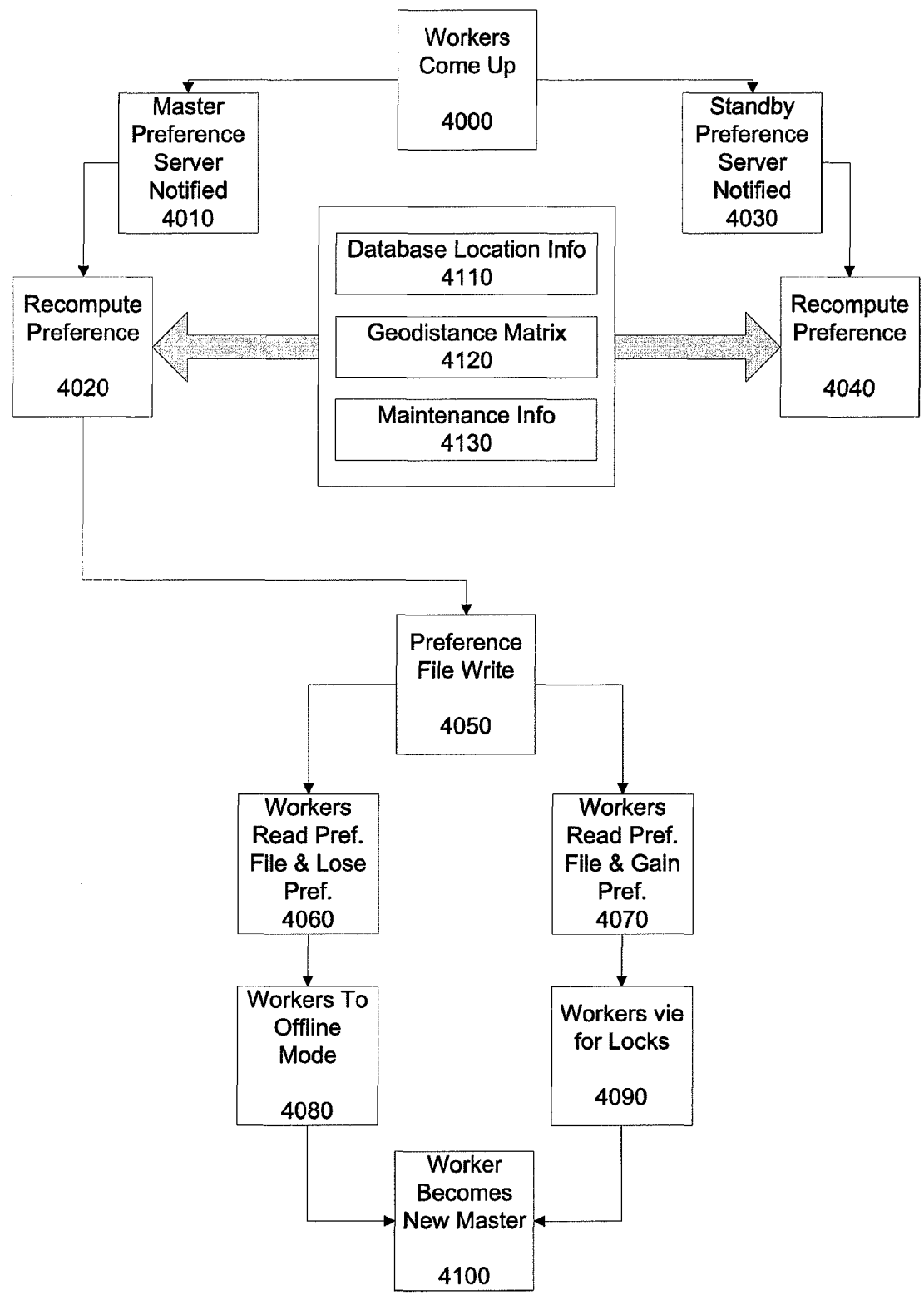
FIG. 2b depicts flowchart showing a variation of an automated master election scheme as described herein.

Variations of the master election process are not limited to database failover events, however. In some variations, a master election process may be initiated anytime workers become available within the global cell or overall cell network. Such a variation is shown in FIG. 2b.

When a new or previously offline worker comes up 4000, the preference servers 4010 4030 are notified either directly or by a notification service operating in the cell network. While the database location information 4110 and production change request information 4130 and associated geo-distance preference information 4120 are unchanged, the presence of a new worker 4000 may nonetheless prompt the preference server(s) to re-compute worker preference information 4020 4040.

In the variation shown, preference information is computed based on a location of the database 4110, any extant or pending production change requests 4130, and a geo-distance matrix 4120 showing related location information for all cells in the network. In other variations, known or estimated data throughput rates, indicia of processing power or speed, or known or estimated data connection speeds for all cells in the network may be included with or used in place of the geodistance matrix information.

The notifications to the preference servers 4010 4030 in such a variation include information about a cell where the worker is located in order to facilitate preference computation based on cell distance and, in some variations, performance data. In other variations, workers may only provide location data without providing cell information. In some such variations a geodistance matrix 4120 may be replaced with a listing of known cell locations and preference may be re-computed 4020 4040 on the basis of known worker locations and the database location 4110.

Once the preference servers re-compute the preference information 4040 4020 for the workers, master preference server writes the re-computed preference information to the preference file(s) 4050. Preference file read operations are automated and recurring in the system due to the automated nature of the solution discussed herein.

In some variations, workers may read the preference files on a regular interval, such as every five or ten minutes. In other variations, to save on network congestion and speed up the preference file checking process, workers may check a last-modified timestamp of the preference file before reading the preference file. In some variations, a worker may remember a previously-checked time-stamp of the preference file. In other variations, a worker may be configured to check the time-stamp of the preference file on a regular interval, such as every five or ten minutes, and also configured to presume that any time-stamp older than a certain threshold amount as compared to the current time is a previously-checked time-stamp. A time-stamp more than an hour old, for example, may indicate that the preference file has not been updated since it was last read. In such time-stamp variations, the workers and cells may need to share a common clock or timing signal. In some variations, such a common clock or clock synchronization signal may be provided as part of a notification service.

Workers in all the cells, including the currently preferred cells, read the preference information 4060 4070. Workers in the currently preferred cell read the preference information from the preference file to find out that they have lost preference 4060 in cases where a preference recomputation 4020 and subsequent preference file update 4050 indicate a new preferred cell or otherwise show new preference criteria that the currently preferred workers no longer meet. In such cases, the currently preferred worker loses its preferred status 4060 and all the workers in the now non-preferred cell are in an "offline" mode 4080. In this case, "offline" does not mean that the workers are necessarily de-activated or otherwise non-operational. "Offline" only means that the workers are no longer able to perform operations on the real or live database data.

Workers in non-preferred cells also read the updated preference information. Those workers in a cell now identified as preferred in the preference file(s) read the preference file information to find out that they have gained preference 4070. These workers then proceed to vie for the master lock(s) 4090 release by the worker(s) in the previously preferred cell. In some variations, lock competition may be for a single master lock, with the worker first securing that lock becoming the master worker 4100. In other variations, there may be multiple master locks available and the worker securing the most locks becomes the master worker 4100. The master worker is the worker that now has "online" status, meaning that it is the worker permitted to do "real" work, which is work affecting the actual data in the database.

The above-described processes are preferably fully automated, allowing for the preference server and master worker roles to be "tethered" to the database such that in a database failover event, a new master preference server and new master worker are automatically selected without requiring administrative intervention/control. In some variations, preference selection parameters may also be automatically re-configured and/or decided based on the overall health of the cells/clusters and the state of the associated communication network(s). In some variations, such information may be fed to an automated preference strategy utility that determines if a latency-reducing, processing-speed maximization, or congestion-minimizing selection scheme will produce the best performance given a particular availability state of resources and networks. Furthermore, the disclosures herein are applicable to any system requiring high availability, such as content, domain name, IP address, or e-mail serving systems.

Only exemplary embodiments of the systems and solutions discussed herein are shown and described in the present disclosure. It is to be understood that the systems and solutions discussed herein are capable of use in various other combinations and environments and are capable of changes or modifications within the scope of the concepts as expressed herein. Some variations may be embodied in combinations of hardware, firmware, and/or software. Some variations may be embodied at least in part on computer-readable storage media such as memory chips, hard drives, flash memory, optical storage media, or as fully or partially compiled programs suitable for transmission to/download by/installation on various hardware devices and/or combinations/collections of hardware devices. Such variations are not to be regarded as departure from the spirit and scope of the systems and solutions discussed herein, and all such modifications as would be obvious to one skilled in the art are intended to be included within the scope of the following claims.

The invention claimed is:

1. A geographically distributed, fault-tolerant computing arrangement having automated preferred master election capability, the system comprising:
a first cell at a first location having at least one first cell worker of a particular worker type, the first cell being designated a current preferred cell and the first cell worker being designated a master worker, where a master worker is one that is permitted to interact with data on a first production database at a first geographic location;
a preference server; and
a second cell at a second location having at least one second cell worker;
where, responsive to receiving a notification of a production database failover event where the first production database is replaced by a second production database at a second geographic location,
the preference server calculates new preference parameters based on
the database failover event notification,
the second geographic location,
the first cell location, and
the second cell location, the second cell location being closer to the second geographic location the first cell location;
the preference generates data identifying the second cell as a newly preferred cell based on the calculated new preference parameters and provides said generated data to workers in the first and second cells;
the first cell worker loses its designation as the master worker and the first cell loses its designation as the current preferred cell based on said provided data;
the second cell worker becomes designated as the master worker and the second cell becomes designated as the current preferred cell based on said provided data; and
where said generated data is written to a preference file that is read by said workers.

2. A geographically distributed, fault-tolerant computing arrangement having automated preferred master election capability, the system comprising:
a first cell at a first location having at least one first cell worker of a particular worker type, the first cell being designated a current preferred cell and the first cell worker being designated a master worker, where a master worker is one that is permitted to interact with data on a first production database at a first geographic location;
a preference server; and
a second cell at a second location having at least one second cell worker;
where, responsive to receiving a notification of a production database failover event where the first production database is replaced by a second production database at a second geographic location,
the preference server calculates new preference parameters based on
the database failover event notification,
the second geographic location,
the first cell location, and
the second cell location, the second cell location being closer to the second geographic location the first cell location;
the preference generates data identifying the second cell as a newly preferred cell based on the calculated new preference parameters and provides said generated data to workers in the first and second cells;
the first cell worker loses its designation as the master worker and the first cell loses its designation as the current preferred cell based on said provided data;
the second cell worker becomes designated as the master worker and the second cell becomes designated as the current preferred cell based on said provided data; and
where,
the preference server includes a master preference server and at least one secondary preference server;
the master and secondary preference servers independently calculate the new preference parameters; and
only the master preference server provides said generated data to said workers.

3. A geographically distributed, fault-tolerant computing arrangement having automated preferred master election capability, the system comprising:
a first cell at a first location having at least one first cell worker of a particular worker type, the first cell being designated a current preferred cell and the first cell worker being designated a master worker, where a master worker is one that is permitted to interact with data on a first production database at a first geographic location;
a preference server; and
a second cell at a second location having at least one second cell worker;
where, responsive to receiving a notification of a production database failover event where the first production database is replaced by a second production database at a second geographic location,
the preference server calculates new preference parameters based on
the database failover event notification,
the second geographic location,
the first cell location, and
the second cell location, the second cell location being closer to the second geographic location the first cell location;
the preference generates data identifying the second cell as a newly preferred cell based on the calculated new preference parameters and provides said generated data to workers in the first and second cells;
the first cell worker loses its designation as the master worker and the first cell loses its designation as the current preferred cell based on said provided data;
the second cell worker becomes designated as the master worker and the second cell becomes designated as the current preferred cell based on said provided data; and
where
the first cell worker releases at least one master lock upon losing its designation as the master worker; and
the second cell worker acquires the released master lock as part of becoming designated as the master worker.

4. A method of preferred master election in a geographically distributed, fault-tolerant database system that includes a first cell having a first cell location and at least one first cell worker, the first cell being designated as a current preferred cell and one first cell worker being designated as a master worker, where a master worker is one that is permitted to interact with data on a production database, and a second cell having a second cell location and at least one second cell worker, the method comprising:
detecting a database failover event indicating a transition from a first production database at a first geographic location to a second production database at a second geographic location;

re-computing preference information for the first and second cells with a preference server based on
    said detecting,
    the second geographic location,
    the first cell location, and
    the second cell location,
    the second cell location being closer to the second geographic location than the first cell location;
generating data that identifies the second cell as a newly preferred cell based on the re-computed preference information;
providing the generated data to workers in the first and second cells with the preference server, said providing the generated data including writing the generated data to a preference file with the preference server; and reading the preference file with workers in the first and second cells;
removing the current preferred designation of the first cell and the master worker designation of the one first cell worker based on said provided data;
designating the second cell as the current preferred cell and designating the one second cell worker as the master worker based on said provided data.

5. A method of preferred master election in a geographically distributed, fault-tolerant database system that includes a first cell having a first cell location and at least one first cell worker, the first cell being designated as a current preferred cell and one first cell worker being designated as a master worker, where a master worker is one that is permitted to interact with data on a production database, and a second cell having a second cell location and at least one second cell worker, the method comprising:
    detecting a database failover event indicating a transition from a first production database at a first geographic location to a second production database at a second geographic location;
    re-computing preference information for the first and second cells with a preference server based on
        said detecting,
        the second geographic location,
        the first cell location, and
        the second cell location,
        the second cell location being closer to the second geographic location than the first cell location;
    generating data that identifies the second cell as a newly preferred cell based on the re-computed preference information;
    providing the generated data to workers in the first and second cells with the preference server;
    removing the current preferred designation of the first cell and the master worker designation of the one first cell worker based on said provided data;
    designating the second cell as the current preferred cell and designating the one second cell worker as the master worker based on said provided data, and
    where
        removing the master worker designation of the one first cell worker includes releasing a master lock held by the one first cell worker; and
        designating the one second cell worker as the master worker includes acquiring the released master lock by the one second cell worker.

6. The method of claim 5, where
the at least one second cell worker includes a plurality of second cell workers;
    said plurality of second cell workers compete with each-other to acquire the released master lock in a lock competition; and
    the one second cell worker from among said plurality that acquires said master lock is designated as the master worker.

7. The method of claim 6, where
the master lock includes a plurality of master locks;
said plurality of second cell workers compete with each-other to acquire multiple master locks in a lock competition;
the one second cell worker from among said plurality of second cell workers that acquires a majority of master locks is designated as the master worker.

8. A method of preferred master election in a geographically distributed, fault-tolerant database system that includes a first cell having a first cell location and at least one first cell worker, the first cell being designated as a current preferred cell and one first cell worker being designated as a master worker, where a master worker is one that is permitted to interact with data on a production database, the method comprising:
    providing a second cell having a second cell location;
    detecting at least one second cell worker being added to the second cell;
    notifying a preference server of the detected at least one second cell worker;
    re-computing preference information for the first and second cells with the preference server based on
        said notifying,
        a location of the production database,
        the first cell location, and
        the second cell location,
        the second cell location being closer to the location of the production database than the first cell location;
    generating data that identifies the second cell as a newly preferred cell based on the re-computed preference information;
    providing the generated data to workers in the first and second cells with the preference server, said providing the generated data including writing the generated data to a preference file with the preference server; and reading the preference file with workers in the first and second cells;
    removing the current preferred designation of the first cell and the master worker designation of the one first cell worker based on said provided data;
    designating the second cell as the current preferred cell and designating the one second cell worker as the master worker based on said provided data.

9. A method of preferred master election in a geographically distributed, fault-tolerant database system that includes a first cell having a first cell location and at least one first cell worker, the first cell being designated as a current preferred cell and one first cell worker being designated as a master worker, where a master worker is one that is permitted to interact with data on a production database, the method comprising:
    providing a second cell having a second cell location;
    detecting at least one second cell worker being added to the second cell;
    notifying a preference server of the detected at least one second cell worker;
    re-computing preference information for the first and second cells with the preference server based on
        said notifying,
        a location of the production database, the first cell location, and
the second cell location,
the second cell location being closer to the location of the production database than the first cell location;
generating data that identifies the second cell as a newly preferred cell based on the re-computed preference information;
providing the generated data to workers in the first and second cells with the preference server;
removing the current preferred designation of the first cell and the master worker designation of the one first cell worker based on said provided data;
designating the second cell as the current preferred cell and designating the one second cell worker as the master worker based on said provided data; and where
removing the master worker designation of the one first cell worker includes releasing a master lock held by the one first cell worker; and
designating the one second cell worker as the master worker includes acquiring the released master lock by the one second cell worker.

10. The method of claim 9, where
the at least one second cell worker includes a plurality of second cell workers;
said plurality of second cell workers compete with each-other to acquire said master lock in a lock competition; and
the one second cell worker from among said plurality that acquires said master lock is designated as the master worker for the second production database by the master preference server.

11. The method of claim 10, where
the at least one master lock includes a plurality of master locks;
said plurality of second cell workers compete with each-other to acquire multiple master locks in said lock competition;
the one second cell worker from among said plurality of second cell workers that acquires a majority of master locks is designated as the master worker for the production database by the master preference server.

* * * * *